F. A. WHITTEN.
MOTOR CAR BUMPER.
APPLICATION FILED OCT. 25, 1919.
1,383,892.
Patented July 5, 1921.
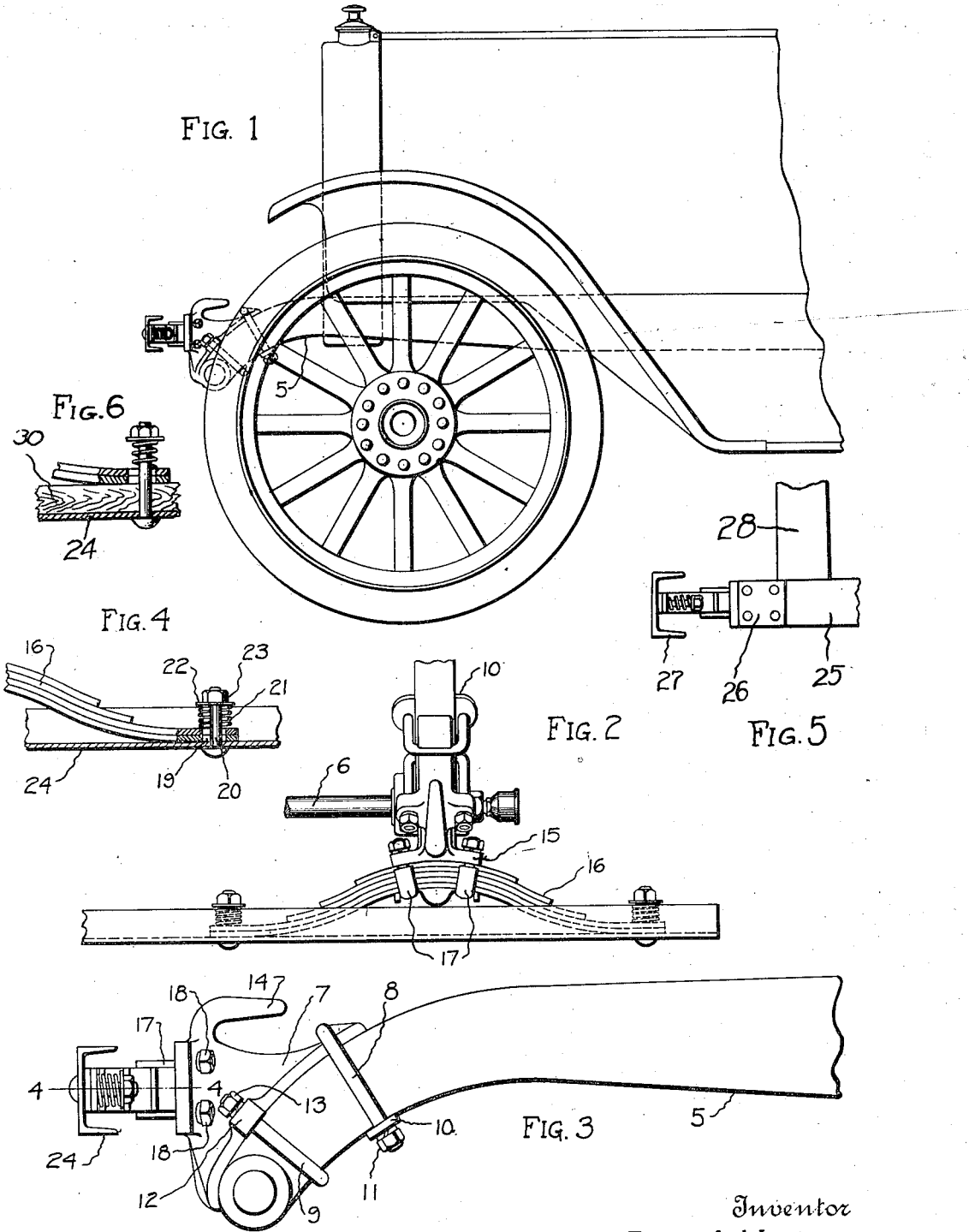
Inventor
FRANK A. WHITTEN
By his Attorneys

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

MOTOR-CAR BUMPER.

1,383,892.  Specification of Letters Patent.  Patented July 5, 1921.

Application filed October 25, 1919. Serial No. 333,182.

*To all whom it may concern:*

Be it known that I, FRANK A. WHITTEN, citizen of the United States, and a resident of Detroit, county of Wayne, and State of Michigan, have invented certain new and useful Improvements in Motor-Car Bumpers, of which the following is a full, clear, concise, and exact description, such as will enable others skilled in the art to which the invention relates to make and use the same, reference being made therein to the accompanying drawings, which form a part of this specification.

My invention relates to bumpers designed to be used at the front or rear or at both ends of an automobile, motor truck, or other self-propelled vehicle, in order to cushion the effect of a collision should the vehicle so equipped run into another vehicle or object, or should another vehicle run into or collide with the vehicle equipped with the bumpers.

The object of my invention is to provide an improved automobile bumper which will be extremely simple in construction and cheap to manufacture, which will be of strong and durable construction, and which will be extremely effective as a protection to the vehicle with which it is used against collision from following vehicles or should the vehicle equipped with the bumper run into another vehicle or object.

The drawing accompanying and forming a part of this specification illustrates the preferred form of my automobile bumper; although it will be appreciated that the same may be variously modified as to the details thereof, and that my invention includes all such variations and modifications of the particular embodiment thereof illustrated as come within the scope of the concluding claims.

Referring now to the drawing,

Figure 1 is a side view of the front portion of an automobile equipped with a front bumper made in accordance with my invention.

Fig. 2 is a fragmentary view showing the bumper and the way in which it is connected with the frame of the vehicle in plan.

Fig. 3 is a fragmentary view showing the front portion of the frame member of the vehicle on an enlarged scale, the bracket whereby the bumper is supported, and the bumper itself, all in side elevation.

Fig. 4 is a fragmentary view showing a section upon a horizontal plane indicated by the line 4—4, Fig. 3.

Fig. 5 is a fragmentary view showing the front portion of a truck frame member on an enlarged scale and a modified form of bracket particularly adapted thereto.

Fig. 6 is a fragmentary view showing a section of the bumper bar reinforced upon a horizontal plane.

Referring to the drawing, the reference numeral 5 designates one of the two side members of the frame of a vehicle from which the body thereof, the engine, and other parts are supported, some of which are indicated in outline in Fig. 1; and which frame may be of any form or construction suitable for supporting the various portions of the vehicle from the wheels and axles thereof. The front ends of the two frame members, it being understood that there is one such member upon each side of the vehicle, are tied together by a cross-bar 6 in the form of my invention illustrated, and as is indeed usual in motor vehicle frame constructions.

In the following description the details concerned with one end only of the bumper will be described, as one end only thereof is shown in the drawing. It will be appreciated, however, that the transversely extending bumper bar which forms the effective and shock receiving part of the bumper extends from side to side of the vehicle; and that the supporting brackets and springs which support the said member are duplicated upon opposite sides of the vehicle, one end thereof being supported from each side member of the frame thereof.

The end portion of the side frame member 5 is curved downward in the embodiment of my invention illustrated; and the reference numeral 7 designates a bracket having a seat shaped to conform with the end of the frame member and which bracket is secured to the said end by means of two similar stirrups 8, 9 U-shaped in form, so as not to necessitate the drilling of holes in the frame member and thus weakening the same. The stirrup 8 is provided with a cross-bar 10 at its lower end through which its free ends extend, and nuts 11 are in threaded engagement with the free ends of the side bars thereof; while the stirrup 9 extends through holes provided in laterally extending ears 12 of the base portion of the bracket and is secured in place by nuts 13 in threaded engagement with the extremities of said yoke. The bracket 7 is further provided with an inwardly extending hook 14 for use in towing the vehicle should it be necessary to do so, or so that the vehicle can exert tractive force through a suitable wire rope or other tractive member should the occasion for such a use of the vehicle arise.

A portion of the bracket 7 is so shaped as to provide a spring support or spring pad 15 shaped to conform with the central portion of a leaf spring 16, which spring is secured in place and to the seat by means of U-shaped clips 17 extending about the spring and the ends of which extend through holes provided in the spring pad and are provided with nuts 18 in threaded engagement with their free ends, to thereby securely hold the leaf spring in place upon the seat provided for its support. The end portions of this leaf spring are fixedly secured to a horizontally disposed preferably channel shaped in cross-section bumper or bar 24 extending transverse and from side to side of the vehicle, the preferred method of securing the spring ends to the bar being illustrated in detail in Fig. 4; from which figure it will be seen that the end of the leaf spring is provided with a slot 19 through which a bolt 20 extends, and that a coil spring 21 is held in place between a washer or plate 22 through which the bolt 20 extends, the bolt extending through the coil spring and the parts being held together by a nut 23. This construction provides a support for the bumper bar in which the leaf springs may straighten should contact between the bar and external object occur without straining the fastening members through which the ends of said springs are secured to the bar, as would be the case if provisions were not made for outward movement of the ends of the spring when the spring is straightened from any cause. The coil spring 21 maintains contact between the supporting leaf spring and the bumper bar and takes up all the looseness at these parts, and the bumper bar being of channel form as shown provides a certain degree of protection for the coil spring and the ends of the leaf spring, and in effect provides a housing for the said ends and for the connecting means whereby the channel iron bumper bar is secured to the spring which supports the same.

In the form of my invention hereinbefore described the side frame members 5 extend beyond the radiator, and themselves provide a support for the brackets 7 which support the bumper. In some forms of motor vehicles however, see Fig. 5, the side frame members 25 do not extend in front of the radiator 28, at least not far enough to support the bumper as far in front of the radiator as is desirable for protective purposes. In such a case an auxiliary plate 26 is secured to the said frames which auxiliary plate serves as a support for the bumper bar 27, the latter being supported through springs of substantially the same form as hereinbefore disclosed, said springs being secured to the auxiliary plate or bracket 26 in substantially the same manner as hereinbefore explained.

The bumper 24 may be made from a piece of bar iron channel shaped in cross section as shown in Figs. 3 and 5 and, the said bar, whether made of channel form or not, may be reinforced by a backing plate or strip of wood as indicated at 30 Fig. 6, thereby materially increasing the strength of the bar without greatly increasing its weight.

Having thus described and explained my invention, I claim and desire to secure by Letters Patent:

1. In an automobile bumper and in combination with a side frame member, a bracket fixedly secured to said member adjacent the end thereof; a spring support carried by and integral with said bracket; a horizontally disposed leaf spring the middle portion of which is secured to said spring support; a horizontally disposed bumper bar; and securing means whereby the free ends of said leaf spring are secured to said bumper bar.

2. In an automobile bumper and in combination with a side frame member, a bracket secured to said member adjacent the end thereof, and which bracket is provided with a hook; a spring support carried by said bracket; a horizontally disposed leaf spring the middle portion of which is secured to said support; and a horizontally disposed bumper bar channel shape in cross-section supported by said spring.

3. In an automobile bumper and in combination with a side frame member, a bracket fixedly secured to said member adjacent the end thereof; a spring support carried by and integral with said bracket; a horizontally disposed leaf spring the middle portion of which is secured to said spring support, and the end portions of which are provided each with a hole; a horizontally disposed bumper bar; and securing bolts extending through the holes in the ends of said spring and through said bumper bar to thereby secure said bar to said spring.

4. In an automobile bumper and in combination with a side frame member, a bracket secured to said member adjacent the end thereof; a spring support carried by said bracket; a horizontally disposed leaf spring the middle portion of which is secured to said spring support, and the end portions of which are provided with elongated slots; a horizontally disposed bumper bar channel shape in cross-section; bolts extending through said bumper bar and through said slots; and coil springs surrounding said bolts and acting between the ends of said leaf spring and an abutment carried by said bolt to thereby yieldably hold the ends of said leaf spring to said bumper bar.

5. In an automobile bumper and in combination with a side frame member, a bracket secured to said member adjacent the end thereof; a spring support carried by and integral with said bracket; a horizontally disposed leaf spring the middle portion of which is secured to said spring support; a horizontally disposed bumper bar channel shape in cross-section; securing bolts extending through holes in the end portions of said leaf spring and through holes in said bumper bar to thereby secure said bar to said spring; and means associated with said bolts for yieldably holding the ends of said leaf spring in engagement with said bumper bar.

6. In an automobile bumper and in combination with a side frame member having a depending curved portion at its end, a bracket having a seat shaped to correspond with the end portion of said frame member; U-shaped stirrups extending about said end portion to thereby secure said bracket in place upon the end of said side frame member; a spring support carried by said bracket; a horizontally disposed leaf spring the middle portion of which is secured to said spring support, and the end portions of which are provided each with a hole; a horizontally disposed bumper bar of channel form in cross-section; and securing bolts extending through the holes in the ends of said spring and through holes provided in said bumper to thereby secure said bar to said spring.

7. In an automobile bumper and in combination with a side frame member, a bracket secured to said member adjacent the end thereof; a spring support carried by said bracket; a horizontally disposed leaf spring, the middle portion of which is secured to a spring support, and the end portions of which are provided each with a hole; a horizontally disposed bumper bar of channel form in cross section, and reinforced with a wooden strip; securing bolts extending through the holes in the ends of said spring and through holes provided in said bumper to thereby secure said bar to the spring; and means associated with said bolts for yieldably holding the ends of said leaf spring in engagement with said bumper bar.

In testimony whereof I affix my signature.

FRANK A. WHITTEN.